United States Patent Office 3,288,893
Patented Nov. 29, 1966

3,288,893
DENTURE PRIMING
Leo F. Stebleton, Midland, Mich., assignor to Dow Corning Corporation, Midland, Mich., a corporation of Michigan
No Drawing. Filed Jan. 8, 1964, Ser. No. 336,372
2 Claims. (Cl. 264—17)

This invention relates to an improvement in a process of lining dentures with silicone rubber.

A significant number of prosthetic dental appliances need a resilient lining for patient tolerance, comfort and retention. Examples of cases where such linings are of particular importance are: in the complete lower denture where the patient shows a senile atrophy; in developing maximal retention where the residual ridges are bilaterally undercut; in mouths where a hard median palatal raphe is associated with a poor retentive potentiality; in obturators for acquired and congenital clefts of the palate; and where hypersensitivity exists, as in the case of irradiated tissue.

The dental profession considers that the essential characteristics of a soft liner should include: (1) insolubility or very little solubility in the mouth environment, (2) no serious effect on the denture base, (3) maintenance of the softness and resiliency, (4) low water absorption, (5) small dimensional change during processing, (6) ease of cleaning combined with good abrasion resistance, (7) color stability, (8) satisfactory tissue tolerance and (9) good adhesion to the denture base.

Silicone rubbers have attracted considerable attention as soft liners for dentures because they are materials which come the closest to possessing all the desirable characteristics that denture liners should have. However, there has been some difficulty obtaining good adhesion of silicone rubber liners to the denture bases just as with other liners. It is to this specific problem, i.e. obtaining good adhesion of silicone rubber liners to denture bases that this invention is directed.

Various methods have been explored for improving the adhesion of silicone rubber liners to denture bases. Among the methods tried was the use of a primer. Results obtained with primers were very discouraging since little if any improvement in adhesion could be noted and at best the results were irratic. It has now been discovered, however, that if a silane having the formula $Q_nSiZ_{4-n}$, wherein Q is a substituent attached to the silicon atom via a silicon-carbon bond and contains unsaturation in the terminal position, Z is a member selected from the group consisting of alkoxy and acyloxy groups containing from 1 to 3 carbon atoms and $n$ is an integer from 1 to 3 inclusive, is used to prime the surface of the denture prior to bonding the silicone rubber thereto, good adhesion is obtained.

The silanes useful in primers are any of those which have the above formula $Q_nSiZ_{4-n}$. The Q substituent is one which is attached to the silicon atom via a silicon-carbon bond, that is, an Si—C bond. Also, the Q substituent must contain unsaturation in the terminal position, that is to say, the terminal end of the Q substituent must have the configuration $CH_2=C$. Examples of such Q substituents are $CH_2=CH-$, $CH_2=CHCH_2-$, $CH_2=CHCH_2CH_2-$, $CH_2=C(CH_3)CH_2CH_2-$,
$CH_2=CH(CH_2)_4-$, $CH_2=C(CH_3)COOCH_2CH_2CH_2-$,
$CH_2=CHCOOCH_2CH_2CH_2-$ and
$CH_2=CHCH_2OCH_2CH_2CH_2-$ In the above formula, Z is a member selected from the group consisting of alkoxy or acyloxy groups containing from 1 to 3 carbon atoms. For example, Z can be a methoxy, ethoxy, propoxy, isopropoxy, formyloxy, acetoxy or a propionoxy group. The preferred silanes to be employed as primers are allyltrimethoxysilane, allyltriacetoxysilane and $CH_2=C(CH_3)COOCH_2CH_2CH_2Si(OCH_3)_3$ The primers of this invention can be employed to bond heat vulcanizable or room temperature vulcanizable silicone rubbers to denture bases. The primers of this invention can be used to bond these silicone rubbers to denture bases in either the preparation of new dentures or in the lining of existing dentures. It should be obvious, of course, that the surface to which the silicone rubber is to be bonded must be clean since it is generally difficult to obtain bonds between dirty surfaces regardless of the materials being joined together.

In order that those skilled in the art can better understand how the present invention can be practiced, the following examples are given by way of illustration and not by way of limitation.

Example 1

This example illustrates the use of one of the primers of this invention in the preparation of a new silicone rubber lined denture.

A wax model of a full lower denture was constructed in the usual manner, invested in the processing flask, the wax boiled out and a liquid foil separating agent painted onto the model surfaces of the flask half containing the teeth. A shim about 2 mm. thick was carefully formed on the stone model in its half of the flask using a dental plate wax. Methyl methacrylate was placed and packed into the model cavity using a clean sheet of polyethylene. Then a light even coat of allyltrimethoxysilane was applied to the surface of the uncured methyl methacrylate and allowed to dry for about 10 minutes. While the primer was drying, the shim was removed from the stone model and the model and land area of the lower half of the flask were brushed with a 10% aqueous solution of Tide which functions as a release agent. A room temperature vulcanizable silicone rubber was then applied to the primed surface in such quantity so that there was a slight overloading of the space created by the shim. The flask halves were then closed together until there was metal to metal contact, the flask placed in its clamp and then introduced into a water bath. The temperature of the water was raised to 165° F. and the flask allowed to remain in the bath overnight. This caused the methyl methacrylate to cure and the silicone rubber to become vulcanized. The following morning the flask was removed from the bath and allowed to cool. The flask halves were then parted and the lined denture removed. The thin flash formed from the excess silicone rubber was trimmed away with a small, sharp scissors and then the juncture between the silicone rubber and the denture base finished with an arbor band. The methyl methacrylate portion of the denture was then finished and polished in the usual manner. The use of the primer resulted in excellent adhesion between the silicone rubber liner and the denture base.

Example 2

This example illustrates the use of one of the primers of this invention in providing an existing denture with a silicone rubber lining.

A reline impression for a full lower denture was taken by the dentist in the usual manner. The denture was then boxed in wax and a dental stone model made. A counter part of stone was then poured. When the counter part had set, the top surface of the counter part and the bottom surface of the model were trimmed so that they were parallel. The denture was then removed from the counter part and model and all of the impression material removed from its surface. Then the tissue surface of the denture was hollowed out to a depth of about 2 mm. The hollowed out surface was cleaned with a blast of compressed air, care being taken not to contaminate the surface with skin oils or other foreign matter which might affect the bond to be formed between the silicone rubber and denture base material. A thin layer of new acrylic material, which was a mixture of a self curing denture repair powder and liquid material in a powder to liquid ratio of 2:1, was applied to the hollowed out surface and allowed to set for about 30 minutes. A light even coat of allyltrimethoxysilane was applied to the new acrylic surface and allowed to dry about 10 minutes. While the primer was drying, a 10% aqueous solution of Tide was applied to the model and counter part surfaces as a release agent. The denture was then seated in the counter part and a room temperature vulcanizable silicone rubber applied to the primed surface. Then the counter part, containing the denture, was seated on the model and the resulting assembly placed in a bench press until the bottom of the counter part and the floor of the model were fully seated. This assembly was allowed to remain in the press overnight which was sufficient time for the silicone rubber to vulcanize. The model and denture were then separated from the counter part, the model fractured, and the silicone lined denture recovered. The denture was then finished employing an arbor band. The use of the primer resulted in excellent adhesion between the silicone rubber and the denture.

*Example 3*

Full upper dentures as well as partial lower and partial upper dentures lined with silicone rubber have been prepared employing the procedures of Examples 1 and 2.

*Example 4*

When the following silanes are substituted for the allyltrimethoxysilane of Examples 1–3, equivalent results are obtained.

(1) Allyltriacetoxysilane
(2) Allyltriethoxysilane
(3) Allyltriisopropoxysilane
(4) $CH_2=C(CH_3)COOCH_2CH_2CH_2Si(OCH_3)_3$
(5) $CH_2=CH(CH_2)_4Si(OCH_3)_3$
(6) Diallyldimethoxysilane
(7) Triallylmethoxysilane
(8) Diallyldiacetoxysilane
(9) Triallylacetoxysilane
(10) $[CH_2=C(CH_3)COOCH_2CH_2CH_2][CH_2=CHCH_2]Si(OCH_3)_2$ That which is claimed is:

1. In a process of lining a denture with silicone rubber, the improvement comprising priming the surface of the denture with a silane having the formula $Q_nSiZ_{4-n}$, wherein
   Q is an aliphatic substituent attached to the silicon atom via a silicon-carbon bond and contains unsaturation in the terminal position, said Q being composed of carbon and hydrogen atoms or carbon, hydrogen and oxygen atoms,
   Z is a member selected from the group consisting of alkoxy and acyloxy groups containing from 1 to 3 carbons atoms and
   $n$ is an integer from 1 to 3 inclusive, prior to bonding the rubber to the denture.

2. In a process of lining a denture with silicone rubber, the improvement comprising priming the surface of the denture with a silane selected from the group of silanes consisting of allyltrimethoxysilane, allyltriacetoxysilane and $CH_2=C(CH_3)COOCH_2CH_2CH_2Si(OCH_3)_3$.

References Cited by the Examiner

UNITED STATES PATENTS

| 2,777,868 | 1/1957 | Miner et al. | 260—46.5 X |
| 2,777,869 | 1/1957 | Bailey et al. | 260—46.5 X |
| 3,108,898 | 10/1963 | Nitzsche et al. | 156—329 |

ROBERT F. WHITE, *Primary Examiner.*

B. SNYDER, *Assistant Examiner.*